No. 789,305. PATENTED MAY 9, 1905.
L. E. WATERMAN.
CULTIVATOR.
APPLICATION FILED DEC. 16, 1904.
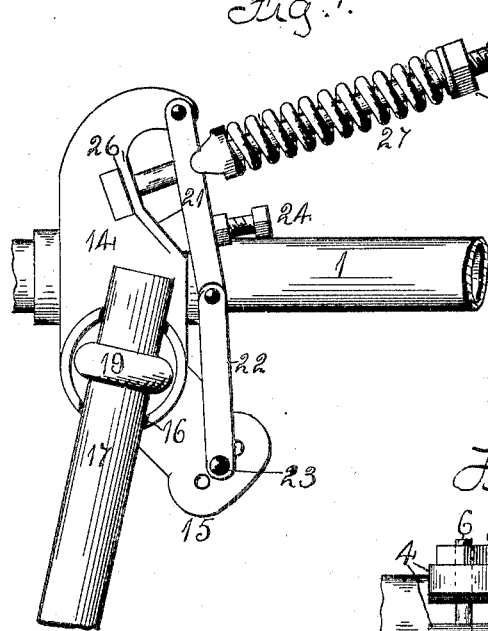
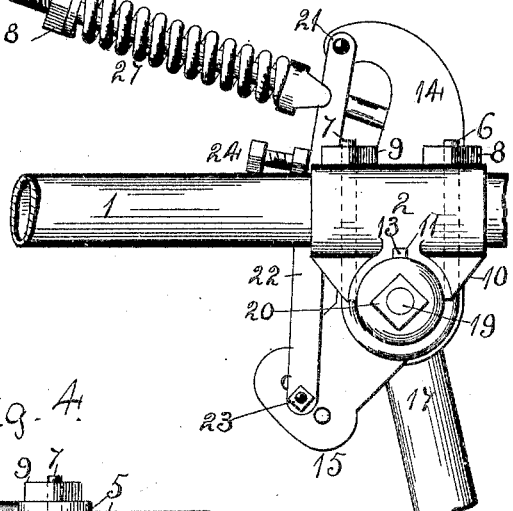
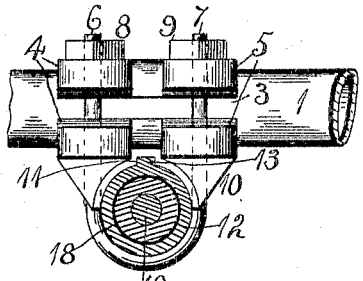
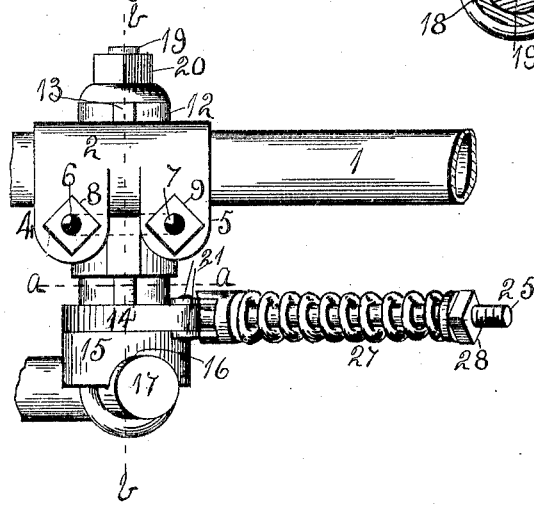
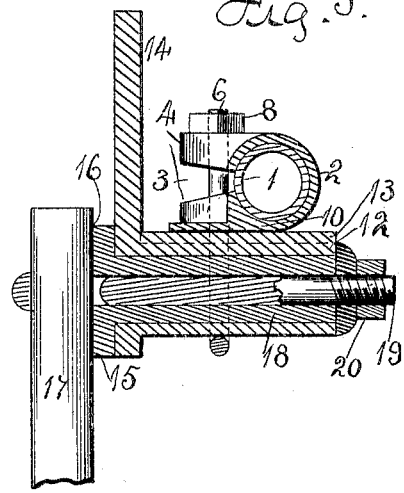
Witnesses:
H. J. Slagle
E. Behel.
Inventor:
Lewis E. Waterman
By A. O. Behel
Atty.

No. 789,305.                                                           Patented May 9, 1905.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

CULTIVATOR.

SPECIFICATION forming part of Letters Patent No. 789,305, dated May 9, 1905.

Application filed December 16, 1904. Serial No. 237,113.

*To all whom it may concern:*

Be it known that I, LEWIS E. WATERMAN, a citizen of the United States, residing at Rockford, in the county of Winnebago and State of Illinois, have invented certain new and useful Improvements in Cultivators, of which the following is a specification.

The object of this invention is to form a connection between the beam and shovel-standard in a manner to permit the standard to be adjusted in the lengthwise direction of the beam and toward and from it.

In the accompanying drawings, Figure 1 is a side elevation. Fig. 2 is a side elevation reverse to that shown at Fig. 1. Fig. 3 is a plan view. Fig. 4 is a section on dotted line *a a*, Fig. 3. Fig. 5 is a section on dotted line *b b*, Fig. 3.

The beam 1 in this instance is tubular and is intended to have the usual connection with the supporting-frame of a cultivator.

Around the beam 1 is located a clamp 2, having one side 3 open and provided with two pair of ears 4 and 5. A U-bolt has one branch, 6, passing through the ears 4 and its other branch, 7, passing through the ears 5. The branch 6 receives a nut 8 on its end, and a nut 9 is placed on the end of the branch 7. Below the body portion of the clamp and integral therewith is formed a semicircular section 10, having a groove 11. A tubular shank 12 is held in connection with the semicircular section 10 by the U-bolt surrounding it and has a rib 13 located in the groove 11 of the clamp. This tubular shank has a bracket 14 connected to it. An arm 15 has a recessed face 16, within which is seated a shovel-standard 17. The arm 15 has a tubular projection 18, which is located within the tubular shank 12. An eyebolt 19 receives the shovel-standard and passes through the tubular projection and receives a nut 20 on its screw-threaded end.

Two links 21 have a pivotal connection with the bracket 14, and to their other ends are pivoted links 22. The lower ends of the links 22 have a connection with the arm 15 by the bolt 23. A screw 24 is supported by the links 21. A bolt 25 has a connection with an ear 26, extending from the bracket 14, and is located between the links 21. A coiled spring 27 surrounds the bolt 25 and is located between the links 21 and a nut 28, turned in connection with the bolt. The action of this coiled spring is to hold the two pair of links in nearly a straight line, which will hold the arm 15 with sufficient force to hold a shovel connected to the standard in working position, but permitting the arm to turn in order that the shovel may pass an obstruction. It will be noticed that the bolt supporting the coiled spring extends in a rearwardly and an upwardly direction with relation to the shovel-standard and beam, the object being to leave the space below the beam and in front of the shovel-standard as free as possible, so as not to gather trash.

By means of the single U-bolt the shovel-standard can be adjusted in the lengthwise direction of the beam toward or from the beam or rocked axially around the beam and clamped in its adjusted position. The rib 13 in its connection with the clamp 2 hold the bracket 14 always in an upright position and permitting it to be adjusted toward and from the beam.

I claim as my invention—

1. The combination of a cylindrical beam, a clamp embracing the beam and having a groove, a bracket having a tubular extension which is provided with a lengthwise rib, a shovel-standard having a connection with bracket, and a U-bolt holding the tubular extension in connection with the clamp, and the clamp in connection with the beam, the rib located in the groove.

2. The combination of a cylindrical beam, a clamp embracing the beam and having an open side, a shovel-standard and a U-bolt holding the standard in connection with the clamp and the clamp in connection with the beam.

3. The combination of a beam, a bracket supported by the beam, a shovel-standard supported by the bracket, a double-link connection between the bracket and standard, a bolt supported by the bracket and a coiled spring surrounding the bolt and exerting its influence on the links, the bolt extending rearwardly and upwardly from the connection of the standard with the bracket.

LEWIS E. WATERMAN.

Witnesses:
 A. O. BEHEL,
 E. BEHEL.